Feb. 16, 1926. Re. 16,265

W. A. HARTY ET AL

ROTARY DRIER

Original Filed April 13, 1923 2 Sheets-Sheet 1

INVENTORS
WILLIAM A. HARTY
FRANK W. MOORE
BY Ellis Spear Jr.
ATTY.

Feb. 16, 1926. Re. 16,265
W. A. HARTY ET AL
ROTARY DRIER
Original Filed April 13, 1923 2 Sheets-Sheet 2
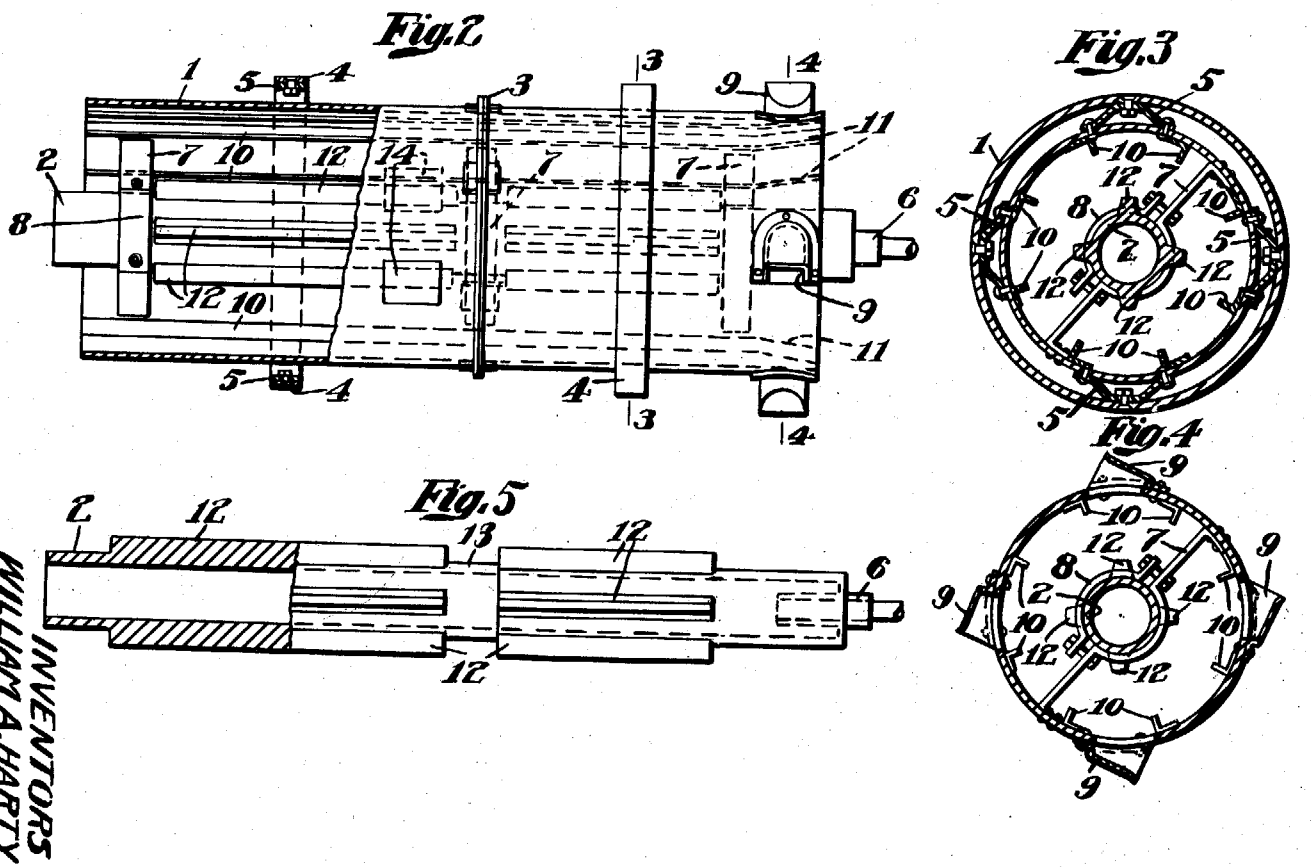
INVENTORS
WILLIAM A. HARTY
FRANK W. MOORE
BY Cecil Spencer
ATTY Reissued Feb. 16, 1926. Re. 16,265

UNITED STATES PATENT OFFICE.

WILLIAM A. HARTY, OF BUFFALO, NEW YORK, AND FRANK W. MOORE, OF THOROLD, ONTARIO, CANADA.

ROTARY DRIER.

Original No. 1,531,438, dated March 31, 1925, Serial No. 631,904, filed April 13, 1923. Application for reissue filed October 16, 1925. Serial No. 62,943.

*To all whom it may concern:*

Be it known that we, WILLIAM A. HARTY, a citizen of the United States, and FRANK W. MOORE, a subject of George V, King of England, residing at Buffalo, county of Erie, State of New York, and Thorold, Province of Ontario, Dominion of Canada, have invented certain new and useful Improvements in Rotary Driers, of which the following is a specification.

This invention relates to rotary driers, and consists in the novel construction, combination and relation of parts described and illustrated in the accompanying specification and drawings, and particularly pointed out in the appended claims.

According to our invention, the drier comprises a rotatable drier shell into which the material to be dried is adapted to be fed and a heating pipe, core or tube disposed within and rotating with said shell.

Preferably the drier is self-loading in action, the intake end of the shell being provided with an annular series of spaced loading scoops which pick up the material to be dried as the shell rotates and deposit it within the dried shell. To insure proper distribution of the material throughout the length of the drier, the inner face of the shell is provided with a longitudinal series of spaced feed ribs which are bent to raise the material to be dried, allowing the material to fall in direct contact to a certain extent, with the heating pipe core or tube as said shell rotates.

Our drier is light in construction and comparatively inexpensive of manufacture, and has a wide range of heat control and of operating speed. Where desirable to screen or sieve the product after drying, this range of speed makes possible the attachment of a reel or screen, on the discharge end of the drier, thereby performing the two distinct functions of drying and screening in one operation. When the screening attachment is used, the heating pipe, core or tube, is extended through the screen. Moreover, the various operating parts of the drier are accessibly located for purposes of repair or replacement, and the fuel consumption is low. Our arrangement not only secures a uniformly complete drying action, but avoids all danger of contamination of the material being dried, by the products of combustion. The self-loading features, moreover, permit the drier to operate with minimum attention.

The construction and operation of our drier, together with a selected embodiment which well illustrates the principles involved, is described and shown in the accompanying specification and drawings, through which like reference characters are applied to indicate corresponding parts, and the characteristic features of novelty are particularly pointed out in the appended claims. In the drawings:

Fig. 2 is an elevation, partly in section, of the drier shell, removed.

Figure 1:
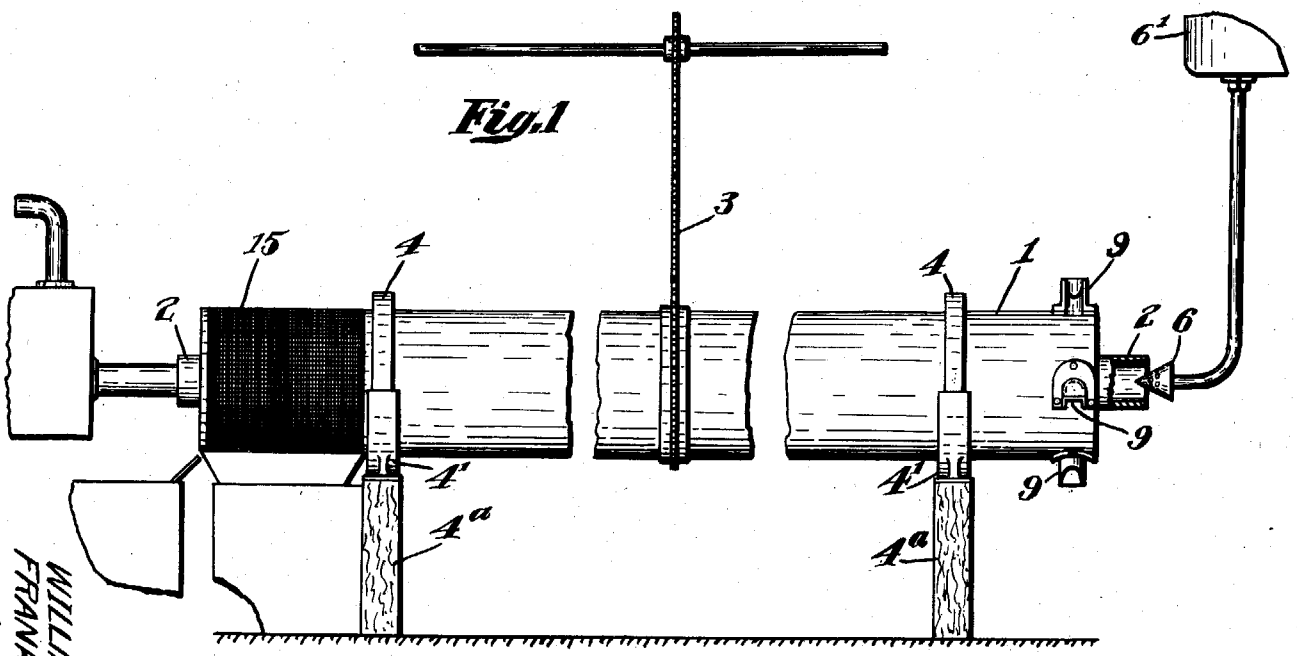
Fig. 1 is a side elevation of a drier installation in accordance with our invention.

Figs. 3 and 4 are sections on the lines 3—3 and 4—4, respectively of Fig. 2, and Fig. 5 is a detail view of the internal heating pipe, removed.

Our drier comprises a rotary shell 1 and an internal heating pipe, core or tube 2 rotating therewith. The shell 1 may be in sections bolted together, and is rotated on annular tires 4 which are supported upon and spaced from the shell 1 by brackets 5 (Fig. 3.) The tires 4 run in ways 4′ carried by supports $4^a$, the height of the supports preferably being such as to cause the shell to slope downwardly from its intake end towards its discharge end (see Fig. 1). The drive 3 for the shell (Fig. 1) may be by sprocket and chain.

The internal heating pipe, core or tube 2 may be heated in any suitable manner. As here shown the pipe is heated by oil, and we have indicated at 6 an oil burner of conventional type for heating said pipe.

Such a burner as indicated at 6 in Fig. 1 should be positioned axially at the end of the pipe 2 so as to project its flame into the end thereof. Care should be taken not to project the burner 6 too far into the end of the hot pipe as if the flame is extinguished or the fuel injected direct an explosion or back fire results. As shown, the flame is projected by the nozzle 6 directly into the open end of the cast iron core which is thereby heated very hot. In practice, it may be kept red hot for half the length of a drier of average size. The burner 6 may be supplied from the oil tank 6′. The heating pipe itself is mounted within the drier shell in supports 7 (Fig. 4) which are fastened to the inner face of said shell and to which the pipe is clamped as indicated at 8.

At its intake end the rotary shell 1 is provided with an annular series of spaced scoops 9 constituting an automatic feed to pick up the material to be dried as the shell rotates. Whether mechanical feed or hand feed is used, precaution against spillage of material at intake end may be provided by bending the spaced feed ribs 10 at the receiving end of the shell as indicated at 11 in Fig. 2. The ribs 10 extend longitudinally of the shell and direct the material onto the rotating heating pipe, core or tube 2. The material is temporarily retained in direct contact therewith by a plurality of spaced longitudinally extending retaining ribs 12 which may be cast integral with the pipe.

The retaining ribs 12 are interrupted between their ends as indicated at 13, Fig. 5, opposite the central pipe support 7, and the shell is provided with one or more hand holes 14, Fig. 2, permitting access to the interior thereof, for the purposes of tightening said pipe support.

Where it is desired to screen the material after drying, a reel or screen 15, Fig. 1, may be mounted at the discharge end of the shell 1 and the heating pipe, core or tube 2 extended through this screen.

Various modifications in the form and construction of our drier may obviously be resorted to within the limits of the appended claims.

What we therefore claim and desire to secure by Letters Patent is:

1. A drier comprising a rotary shell, a screen at the discharge end of the shell and a central heating tube extending through the shell and screen, and rotating therewith and a burner at the end thereof and disposed to project its flame into the tube.

2. A drier comprising a rotary shell, a screen at the discharge end of the shell, a self loading device at the intake end of the shell and a central heating tube extending through the screen and shell and rotating therewith.

3. A drier comprising a rotary shell and a central heating tube rotating therewith, flanged supports for said tube fastened to the inner face of said shell, clamps fastening said tube to said supports, a series of longitudinally extending spaced retaining ribs on said tube, said ribs interrupted between their ends adjacent a tube support and said shell being provided with a hand hole adjacent the points of interruption of said ribs to permit access to the interior of the shell for the purpose of tightening the pipe support.

4. A drier comprising a rotary shell and a central heating tube extending therethrough and rotating therewith and with which the material to be dried is adapted to directly contact, and a burner at the end thereof and disposed to project a flame into the tube.

WILLIAM A. HARTY.
FRANK W. MOORE.